April 28, 1959  B. J. McCOLL  2,884,083
COUPLING CONSTRUCTION
Filed Oct. 15, 1956  4 Sheets-Sheet 1

INVENTOR.
BRUCE J. McCOLL
BY
ATTY.

April 28, 1959

B. J. McCOLL 2,884,083

COUPLING CONSTRUCTION

Filed Oct. 15, 1956

INVENTOR.
BRUCE J. McCOLL
BY
ATTY.

April 28, 1959

B. J. McCOLL 2,884,083

COUPLING CONSTRUCTION

Filed Oct. 15, 1956

INVENTOR.
BRUCE J. McCOLL
BY
ATTY.

April 28, 1959     B. J. McCOLL     2,884,083
COUPLING CONSTRUCTION
Filed Oct. 15, 1956     4 Sheets-Sheet 4
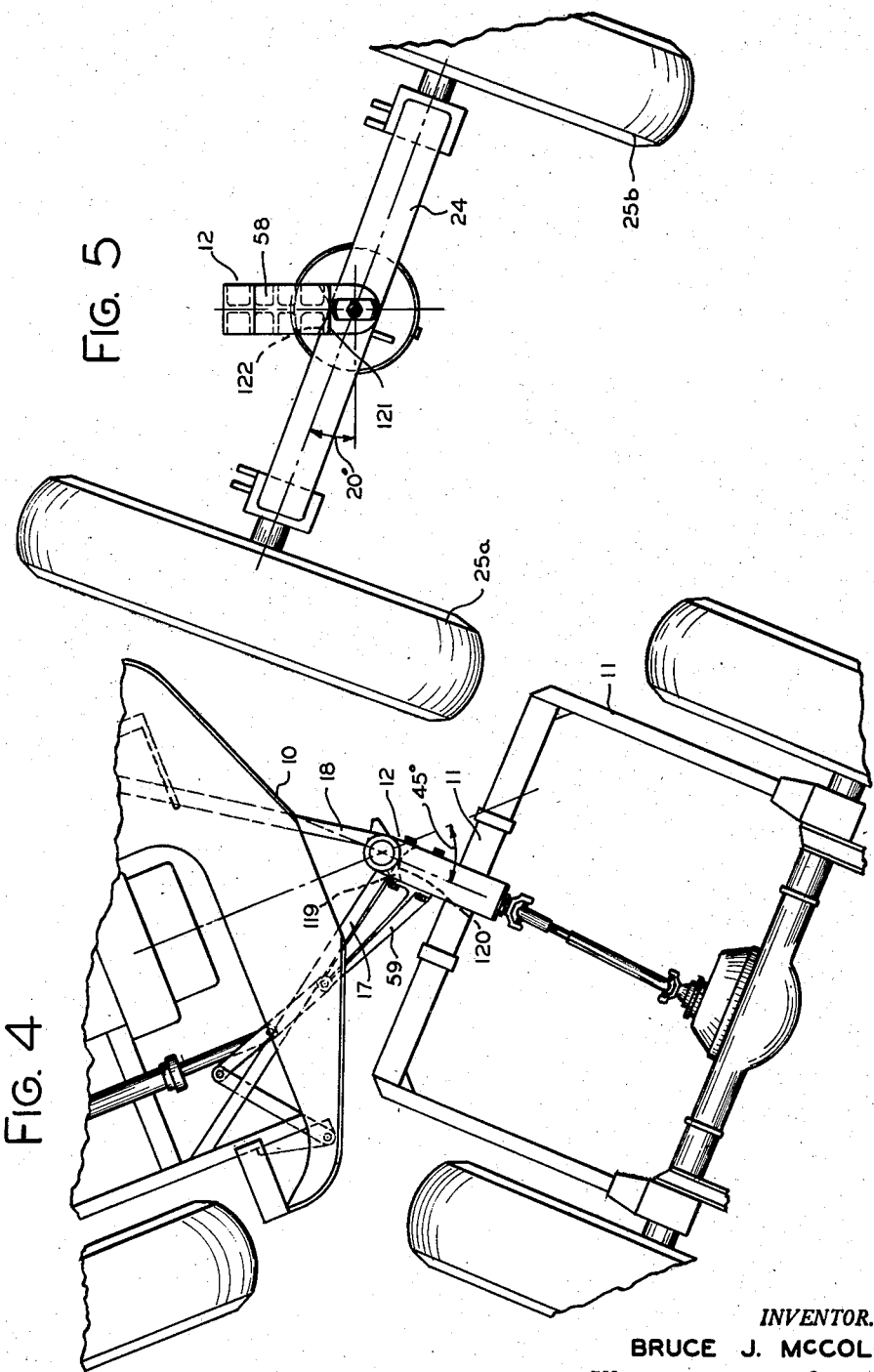
INVENTOR.
BRUCE J. McCOLL
ATTY.

United States Patent Office 2,884,083
Patented Apr. 28, 1959

2,884,083

COUPLING CONSTRUCTION

Bruce J. McColl, Strathmore, Quebec, Canada, assignor to Clark Equipment Company, a corporation of Michigan Application October 15, 1956, Serial No. 615,869

Claims priority, application Canada October 21, 1955

3 Claims. (Cl. 180—12)

This invention relates to a vehicle coupling and more particularly to a coupling for connecting the front and rear chassis of an articulated vehicle.

The general object of this invention is to provide an improved coupling which is simple and rugged in construction, which will permit turning about a vertical axis for steering the vehicle, and which will also permit oscillation about a horizontal axis to enable wheels mounted on the chassis to follow the surface of the ground even when the terrain is so uneven that it would be impractical to use a conventional vehicle.

A further object of this invention is to provide a coupling construction of the type described in which a provision is made for transmitting the drive through the coupling from one chassis of the vehicle to the other chassis.

The manner in which these and other objects are achieved will be apparent from the detailed description which follows of the preferred embodiment of the invention. The scope of the invention will be apparent from the appended claims.

In the drawings which illustrate the preferred embodiment of this invention;

Figure 4 is a diagrammatic plan view of a portion of the vehicle showing the position of the coupling when the vehicle is being turned.

Figure 5 is a diagrammatic end elevation view of the coupling and rear chassis illustrating the oscillatory relative movement provided between the coupling and the rear chassis.

Figure 1:
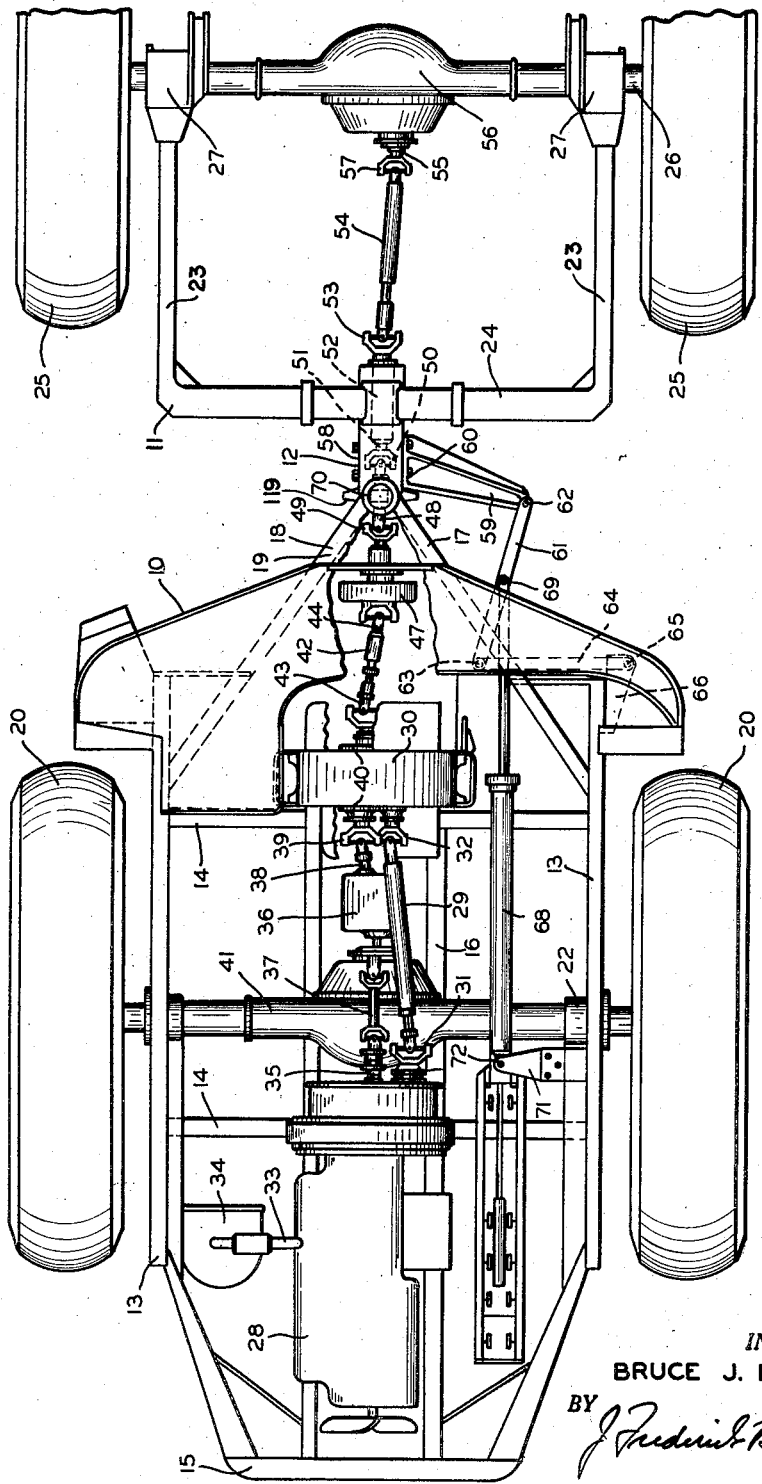
Figure 1 is a plan view of a vehicle embodying the coupling construction of this invention. The superstructure of the vehicle has been omitted for clarity of illustration.
Figure 2:
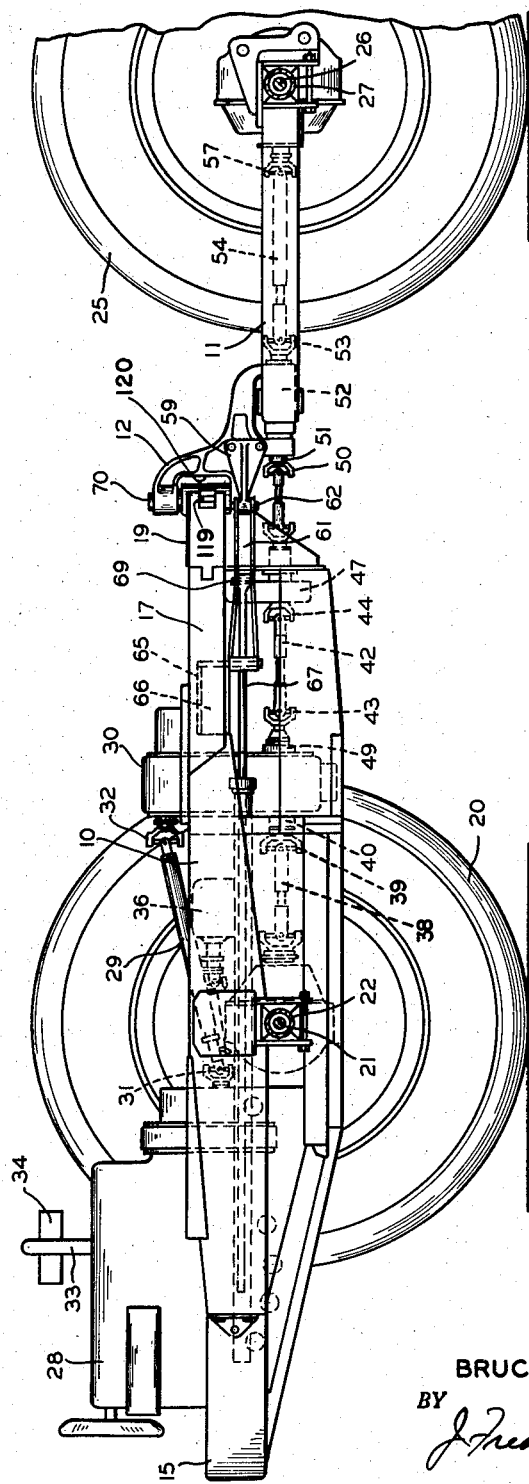
Figure 2 is a side elevation view corresponding to Figure 1.

Referring now to Figures 1 and 2 of the drawings, the vehicle illustrated comprises a front chassis designated generally by the numeral 10, and a rear chassis designated generally by the numeral 11. The front chassis 10 and the rear chassis 11 are connected together by a coupling designated generally at 12.

The front chassis 10 of the vehicle includes a framework having longitudinal members 13 and transverse members 14 and 15. A platform 16 to support the engine is mounted on transverse members 14 and 15. The frame of the front chassis also includes trunnion supporting members 17 and 18 which are angularly disposed to each other in the form of a rearwardly directed V. A platform 19 is mounted on trunnion supporting frame members 17 and 18. Wheels 20 support the front chassis and are mounted on axial shafts 21, which are directly journalled by bearings 22 on longitudinal frame members 13. It will be particularly noted that no conventional spring suspensions are needed. The rear chassis 11 comprises longitudinal frame members 23 connected together at their front ends by transverse frame member 24. The rear chassis 11 is supported by wheels 25 mounted on axle shafts 26 which are directly mounted by bearings 27 at the ends of longitudinal frame members 23.

Engine 28 drives input shaft 29 of transmission 30. As illustrated in Figure 1, universal couplings 31 and 32 respectively conveniently provide for coupling the output of engine 28 with shaft 29 and for coupling shaft 29 with the input to transmission 30. Engine 28 is also provided with a power take off 33 for the pump 34 which generates hydraulic pressure to steer the vehicle. Engine 28 also has a power take off 35 which drives generator 36 through universally coupled shaft 37.

Transmission 30 is a conventional transmission having, however, power outputs for both front and rear wheel drives. Front wheel drive shaft 38 is linked by universal coupling 39 to transmission shaft 40, to drive transmission 41 which in turn drives front axle shafts 21. The transmission shaft 40 also drives rear wheel drive shaft 42 which is coupled to transmission shaft 40 by universal coupling 43. Rear wheel drive shaft 42 is linked by universal coupling 44 to a drive shaft 45 (see Fig. 3 for details) which is journalled in bearing 46 and to which is connected brake drum 47. A telescopically extensible shaft 48 is driven by shaft 45 through universal coupling 49, and is joined by universal coupling 50 to drive shaft 51. Drive shaft 51 is, as will subsequently be apparent from Figure 3, journalled within horizontal trunnion 52. Shaft 51 is connected by universal coupling 53 to tail shaft 54 which drives the input 55 to rear wheel transmission 56 through universal coupling 57. Rear wheel transmission 56 drives axle shafts 26.

The coupling 12 includes a web 58 to which a steering arm 59 is connected by bolts 60. A link 61 is pivotally connected by pin 62 to the free end of steering arm 59. The other end of link 61 is pivotally connected by a pin 63 to a supporting link 64 which in turn is pivotally mounted by pin 65 on flange 66, which is connected to longitudinal frame member 13 to form part of the front chassis. The piston rod 67 of a piston and cylinder type double acting hydraulic actuator 68 is pivotally connected by pin 69 to the center of link 61. Pin 62 is substantially the same distance from vertical trunnion 70 which provides the point of articulation between the front and rear chassis, as the length of link 64.

Accordingly, due to the central connection of pin 69 with link 61, hydraulic actuator 68 steers the vehicle without any substantial lateral displacement of hydraulic actuator 68. Hydraulic actuator 68 is mounted on a longitudinal frame member 13 by mounting bracket 71 which is connected to hydraulic actuator 68 by pivot pin 72 to provide for any slight lateral movement which might be necessary during steering. The elimination of substantial lateral movement of hydraulic actuator 68 makes it possible to use a long stroke hydraulic actuator without it being necessary to provide excessive space to accommodate lateral swinging of the hydraulic actuator. Suitable hydraulic connections (not shown) are provided to actuate hydraulic actuator 68 from pump 34.

Figure 3:
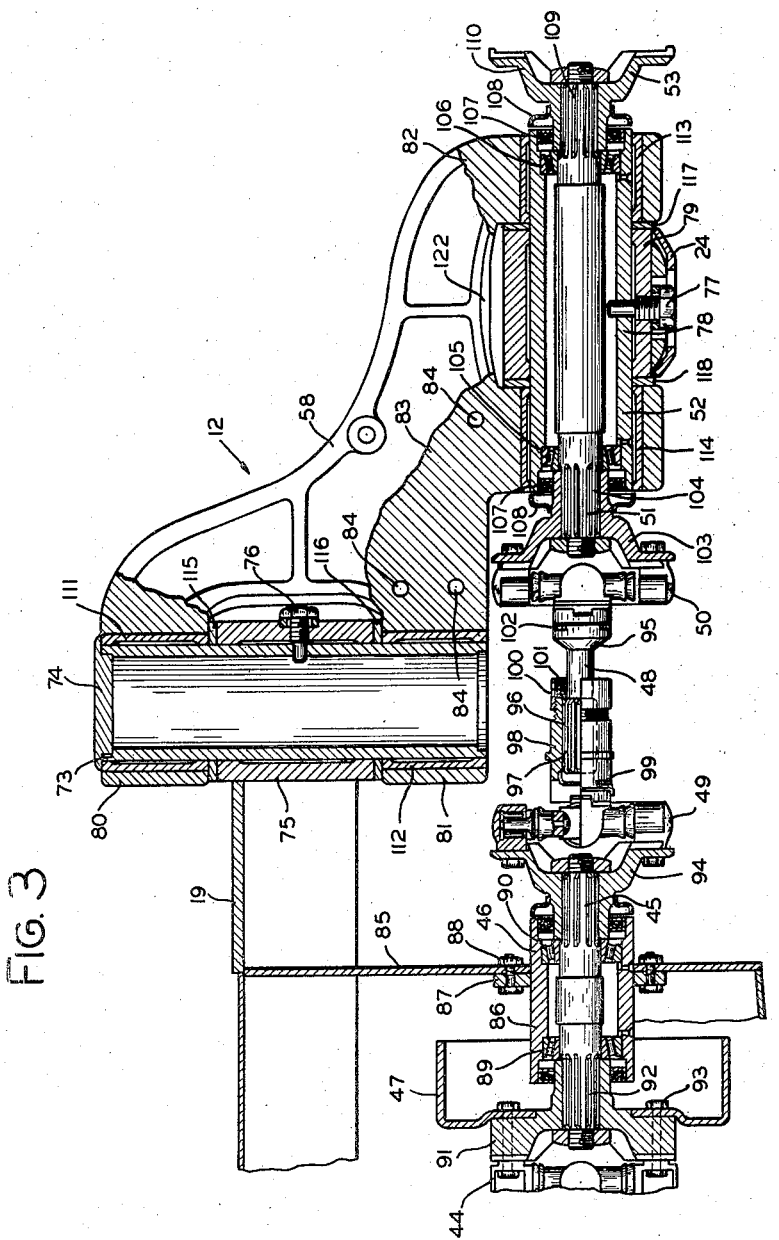
Figure 3 is a detailed sectional side elevation view of the coupling.

Referring now to Figure 3 of the drawings, vertical trunnion 70 comprises a cylindrical tube 73 which has a plug 74 at its upper end and which is connected to the front chassis 10 by means of a sleeve 75, secured to tube 73 by bolt 76. Sleeve 75 is rigidly secured to frame member 19.

Horizontal trunnion 52 is secured to the rear chassis 11 by bolt 77 which fastens the cylindrical tube 78 which provides rear trunnion 52 to a sleeve 79 which is rigidly secured as part of transverse frame member 24. Web 58 is provided with a pair of spaced bearing members 80 and 81 which engage the portions of cylinder 73 which are respectively above and below sleeve 75. Web 58 is also provided with a pair of spaced bearing portions or members 82 and 83 to receive the portions of trunnion cylinder 78 which extend respectively to the rear of and forwardly with respect to sleeve 79. Preferably web 58 and bearing members 80, 81, 82 and 83 are formed as an integral casting. Bolt holes 84 are provided in web 58 for the attachment of steering arm 59.

Bearing 46 for shaft 45 is supported by mounting plate 85 which is secured to frame members 17 and 18. Bearing 46 comprises a bearing sleeve 86 to which is secured an annular flange 87. This flange 87 is connected by bolts 88 to plate 85. Roller bearings 89 and 90 disposed within sleeve 86 support shaft 45. Yoke 91 is splined at 92 to the forward end of shaft 45 to form part of universal coupling 44. Brake drum 47 is also secured to yoke 91 by bolts 93. At the rear end of shaft 45 is splined yoke 94 which forms part of universal coupling 49. Telescopically extensible shaft 48 is provided by a shaft 95 having splines 96 which are slidably engageable with the splines 97 of an internally splined sleeve shaft 98. Sleeve shaft 98 is linked by bolts 99 to universal coupling 49 and has a threaded cap 100 retaining gasket 101. Shaft 95 is connected by bolts 102 to universal coupling 50 which includes a yoke portion 103 splined at 104 to shaft 51. Shaft 51 is journalled within the trunnion provided by cylinder 78 by bearings 105 and 106. Suitable seals 107 and stoneguards 108 provide for bearings 105 and 106. Shaft 51 is splined at 109 to portion 110 of universal coupling 53.

Bearing sleeves 111 and 112 are provided for bearing members 80 and 81 and similarly bearing sleeves 113 and 114 are provided for bearing members 82 and 83. Gaskets 115 and 116 are provided between bearing member 80 and sleeve 75 and between sleeve 75 and bearing member 81 respectively. Similarly, gaskets 117 and 118 are provided between sleeve 79 and bearing members 82 and 83 respectively.

It will be noted that the coupling construction which has been described provides relative movement about the vertical axis between web 58 and frame member 19 of the front chassis, thereby enabling the vehicle to be steered and also gives oscillatory movements about a horizontal axis due to relative rotation which can occur between sleeve 79 which is mounted on the rear chassis and web 58. In addition, the drive from the engine to the rear wheels is conducted through trunnion 52 with the assistance of universal couplings 49 and 50, and the telescopically extensible shaft 48 which lies between universal couplings 49 and 50.

Figure 4 shows the relative positions of front chassis 10 and rear chassis 11. The vehicle is being steered towards the left. Figure 4 shows the extreme position with trunnion steering stop projections 119 abutting against portion 120 of web 58. In Figure 4, the maximum relative movement provided between the front and rear chassis, from stop to stop, is 90 degrees, including 45 degrees either side of the straight ahead position. It will be apparent from Figure 4 that an exceedingly small turning circle is provided for.

Figure 5 shows the limit of relative oscillatory movement between the web 58, trunnion 52, and the transverse frame member 24 of the rear chassis. Abutment is provided between portion 121 of transverse frame member 24 and stop face portion 122 of web 58. The maximum movement provided for in the embodiment as illustrated in Figure 5 is 40 degrees, consisting of 20 degrees of movement on either side of the vehicle position on a horizontal surface.

It will be noted that the extent of relative vertical movement thus provided between wheels 25a and 25b is far greater than would be achieved using conventional spring suspensions, and at the same time the complexities and weaknesses of conventional spring suspensions are avoided.

I claim:

1. In an articulated vehicle having a front chassis and a rear chassis, said rear chassis including a transverse horizontally disposed frame member forming a front portion of the rear chassis, a coupling for connecting said front chassis to said rear chassis comprising a vertical trunnion, means for mounting said vertical trunnion on said front chassis, a horizontal trunnion, means for mounting said horizontal trunnion within the said transverse horizontally disposed frame member of the rear chassis, and a coupling web, bearing means on said coupling web to receive said vertical trunnion, said bearing means comprising a pair of spaced bearing members one of which bearing members engages a portion of the vertical trunnion extending above the said means for mounting the vertical trunnion and the other of which bearing members engages a portion of said vertical trunnion extending below the means for mounting said vertical trunnion, and additional bearing means on said coupling web to receive said horizontal trunnion, said additional bearing means including a pair of spaced bearing members, one of which engages a portion of said horizontal trunnion extending forwardly of the said means for mounting said horizontal trunnion and the other of which last mentioned bearing members engages a portion of said horizontal trunnion extending rearwardly of the mounting means for the horizontal trunnion, the bearing means on said coupling web receiving said vertical trunnion being adapted to permit limited movement between said front chassis and said rear chassis about a vertical axis, the additional bearing means on the coupling web receiving said horizontal trunnion being adapted to permit relative oscillation between said front chassis and said rear chassis about a horizontal axis, the said coupling web and said transverse horizontally disposed frame member of the rear chassis co-acting to limit the oscillatory relative movement between the front and rear chassis.

2. In an articulated vehicle having a front chassis and a rear chassis, and an engine for driving the vehicle mounted in one of said chassis, a coupling for connecting said front chassis to said rear chassis comprising a vertical trunnion, means for mounting said vertical trunnion on one of said chassis, a horizontal trunnion, a means for mounting said horizontal trunnion on the other of said chassis, and a coupling web, bearing means on said coupling web to receive said vertical trunnion, said bearing means comprising a pair of spaced bearing members one of which bearing members engages a portion of the said vertical trunnion extending above the means for mounting the vertical trunnion and the other of which bearing members engages a portion of the vertical trunnion extending below the means for mounting the vertical trunnion, and additional bearing means on said coupling web to receive said horizontal trunnion, said additional bearing means including a pair of spaced bearing members, one of which engages a portion of said horizontal trunnion extending forwardly of the means for mounting the horizontal trunnion and the other of which last mentioned bearing members engages a portion of said horizontal trunnion extending rearwardly of the mounting for the horizontal trunnion, the bearing means on said coupling web receiving said vertical trunnion being adapted to permit limited movement between said front chassis and said rear chassis about a vertical axis, the additional bearing means on the coupling web receiving the said horizontal trunnion being adapted to permit relative oscillation between said front chassis and said rear chassis about a horizontal axis, means for transmitting the drive from said engine from one of said chassis to the other said chassis, comprising a drive shaft journalled within said horizontal trunnion, a drive shaft mounted in one of said chassis, and an extensible universal coupling means between the drive shaft mounted in one of said chassis and the drive shaft journalled within the horizontal trunnion.

3. A coupling as in claim 2 in which the extensible universal coupling comprises a universal coupling mounted on said drive shaft in one of said chassis, a second universal coupling mounted on the drive shaft journalled within said horizontal trunnion, an externally splined shaft driven by one of said universal couplings and an internally splined sleeve shaft engaging said splined shaft and drivably connected to the other of said couplings.

References Cited in the file of this patent

UNITED STATES PATENTS

| | | |
|---|---|---|
| 1,661,737 | Raimer | Mar. 6, 1928 |
| 2,282,267 | Swenson et al. | May 5, 1942 |
| 2,557,513 | Quartullo | June 19, 1951 |
| 2,614,644 | Gustafson | Oct. 21, 1952 |
| 2,676,032 | Stegeman | Apr. 20, 1954 |